United States Patent Office 3,145,082
Patented Aug. 18, 1964

3,145,082
STABILIZED HYDROXYLAMINE AND ITS
METHOD OF PREPARATION
Douglas A. Rausch, James L. Kroon, and Ralph A. Davis, Midland, Mich., assignors to The Dow Chemical Company, Midland, Mich., a corporation of Delaware
No Drawing. Filed Dec. 7, 1959, Ser. No. 857,990
13 Claims. (Cl. 23—190)

This invention relates to a stabilized hydroxylamine and a method for its preparation.

Hydroxylamine would find extensive use as a constituent in rocket propellants if it weren't for the instability of the substance. Hydroxylamine decomposes readily upon standing and in about 2 days is completely decomposed to ammonia and water. This short time greatly limits its utility for this purpose. Before the constituent can be intermixed with the propellants and used it decomposes.

It is therefore an object of this invention to provide a process for stabilizing hydroxylamine. A further object is to provide a stabilized product which could be utilized in rocket propellants.

The above and other objects are attained according to this invention by adding a chelating agent, such as the tetrasodium salt of ethylenediaminetetraacetic acid, the trisodium salt of N - hydroxyethylethylenediaminetriacetic acid, polyvinyl pyrrolidone, and poly-N-vinyl-5-ethyl-2-oxazolidinone to the reaction mixture prior to the crystallization of the hydroxylamine when it is prepared by the reaction of hydroxylamine hydrochloride salt with an alkali metal alcoholate. By the addition of a chelating agent to the solution prior to the crystallization of the hydroxylamine, a stabilized hydroxylamine product is obtained which may be stored up to 190 days without decomposing. Thus, the stability of the product is sufficiently improved so that it will not decompose by the time it is mixed with other ingredients and used as a propellant.

The hydroxylamine is generally prepared by the reaction of a hydroxylamine hydrohalide salt, preferably the hydrochloride salt, with an alkali metal alcoholate in an inert organic solvent or diluent. After the reaction, the alkali metal halide salt obtained as a result of the reaction is removed from the reaction mixture, such as by filtration. The hydroxylamine is then generally recovered from the halide salt-free reaction mixture by crystallization upon cooling of the mixture.

Alcoholates or alkoxides of aliphatic alcohols having less than 7 carbon atoms, such as methanol, ethanol, propanol, butanol, pentanol, and hexanol are generally used in the reaction with the hydroxylamine hydrohalide salt. The alcoholates may be readily prepared by the reaction of an alkali metal, such as sodium or potassium, with the alcohol. In this reaction an excess of alcohol is generally used which later acts as a diluent for the reaction of the hydroxylamine salt with the alcoholate. The higher alcohols have a lower solubility for the hydroxylamine and are thus preferred as diluents. Alcohols, such as methanol or ethanol, may be used, but ether generally must be added to the solution prior to crystallization to decrease the solubility of the hydroxylamine. With propanol and the higher molecular weight alcohols having up to 7 carbon atoms this is not necessary. The major portion of the hydroxylamine may be crystallized out by just cooling the solution to 0° to —10° C. Thus, since the higher molecular weight alcohols are preferred as diluents, the alcoholates of thse alcohols are also generally used.

To obtain the stabilized hydroxylamine product, the chelating agent is added to the reaction mixture prior to the crystallization of the hydroxylamine. Generally the alkali metal halide salt obtained as a result of the reaction is removed and then the chelating agent is added in an amount of from 0.15 to 1.0 weight percent of the remaining reaction mixture.

To further illustrate the invention a series of runs was made where the hydroxylamine was stabilized by the addition of a chelating agent prior to the crystallization of the product from the alcohol solution.

To a two liter flask equipped with a stirrer, a dropping funnel, and a reflux condenser, 140 grams (2 moles) of hydroxylamine hydrochloride, 200 milliliters of butanol and 0.2 gram of phenolphthalein were added. Sodium butoxide was prepared by reacting 47 grams (2 moles) of sodium in 700 milliliters of butanol. This solution was added through the dropping funnel into the two liter flask containing the hydroxylamine hydrochloride salt. The addition was made slowly and the solution in the reaction flask was maintained acid to the phenolphthalein.

When the reaction was completed, the sodium chloride obtained as a result of the reaction was filtered off and washed with butanol and ether. From the reaction mixture free of the sodium chloride salt, two 300 milliliter samples were taken which contained from 12 to 13 grams of the hydroxylamine. To one of the samples the trisodium salt of N - hydroxyethylethylenediaminetriacetic acid was added and to the other the tetrasodium salt of ethylenediaminetetraacetic acid. To each sample, the chelating agent was added in a given amount and the solution was then cooled to a temperature of —10° C. to crystallize the hydroxylamine. The hydroxylamine thus obtained was filtered quickly, washed several times with cold ether and dried by placing it in a desiccator and subjecting it to vacuum to vaporize the ether. The dried product was then stored in closed bottles at 4° C.

The above run was repeated except that polyvinyl pyrrolidone and poly-N-vinyl-5-ethyl-2-oxazolidinone were used as chelating agents.

The details and results obtained using the different chelating agents are given in the table below.

| Chelating Agent Added | Amount Added, grams | Length of Time at 4° C. before Decomposition, days |
|---|---|---|
| Trisodium salt of N-hydroxylethylethylenediamine-triacetic acid | 1.0 | 191 |
| Tetrasodium salt of ethylenediamine-tetraacetic acid | 0.5 | 23 |
| Polyvinyl pyrrolidone | 0.5 | 23 |
| Poly-N-vinyl-5-ethyl-2-oxazolidinone | 0.5 | 29 |

The run above was repeated except that no chelating agent was used. The product obtained upon storage completely decomposed to ammonia and water in 2 days.

What is claimed is:

1. In a process for the preparation of hydroxylamine wherein a hydroxylamine hydrohalide salt is reacted with an alkali metal alcoholate, the alkali metal halide salt formed as a result of the reaction is removed from the reaction mixture, and the hydroxylamine crystallized from the alkali metal halide-free reaction mixture, the step of stabilizing the hydroxylamine produced, which comprises adding a chelating agent selected from the group consisting of the trisodium salt of hydroxylethylethylenediaminetriacetic acid, the tetrasodium salt of ethylenediaminetetraacetic acid, polyvinyl pyrrolidone, and poly-N-vinyl-5-ethyl-2-oxizolidinone to the alkali halide salt-free reaction mixture prior to the crystallization of the hydroxylamine.

2. A process according to claim 1 wherein the hydroxylamine hydrohalide salt is hydroxylamine hydrochloride and the alkali metal alcoholate is sodium butoxide.

3. A process according to claim 2 wherein the chelating agent is added in an amount of from 0.15 to 1.0 weight percent of the alkali metal halide-free reaction mixture prior to crystallization of the hydroxylamine.

4. A process according to claim 3 wherein the chelating agent is the trisodium salt of hydroxylethylethylenediaminetriacetic acid.

5. A process according to claim 3 wherein the chelating agent is the tetrasodium salt of ethylenediaminetetraacetic acid.

6. A process according to claim 3 wherein the chelating agent is polyvinyl pyrrolidone.

7. A process according to claim 3 wherein the chelating agent is poly-N-vinyl-5-ethyl-2-oxazolidinone.

8. A stabilized solid hydroxylamine product consisting essentially of hydroxylamine prepared by crystallizing the hydroxylamine from an alcohol solution to which a chelating agent selected from the group consisting of the trisodium salt hydroxylethylethylenediaminetriacetic acid, the tetrasodium salt of ethylendiaminetetraacetic acid, polyvinyl pyrrolidone, and poly-N-vinyl-5-ethyl-2-oxazolidinone has been added prior to the crystallization of the hydroxylamine.

9. A stabilized product according to claim 8 wherein the chelating agent is added in an amount of from 0.15 to 1.0 weight percent of the alcohol solution prior to crystallization of the hydroxylamine.

10. A stabilized product according to claim 9 wherein the chelating agent is the trisodium hydroxylethylethylenediaminetriacetic acid.

11. A stabilized product according to claim 9 wherein the chelating agent is the tetrasodium salt of ethylenediaminetetraacetic acid.

12. A stabilized product according to claim 9 wherein the chelating agent is polyvinyl pyrrolidone.

13. A stabilized product according to claim 9 wherein the chelating agent is poly-N-vinyl-5-ethyl-2-oxazolidinone.

References Cited in the file of this patent

UNITED STATES PATENTS 2,743,204    Russell _____ Apr. 24, 1956

OTHER REFERENCES

Audrieth et al.: "The Chemistry of Hydrazine," pp. 139–145, John Wiley and Sons (1951).

Moews et al.: "J. Inorg. Nuclear Chem.," vol. 11, pp. 242–246 (1959).

Nuclear Science Abstracts, vol. 10, Abstract 7497 (1956).

Mellor: "Comprehensive Treatise on Inorganic and Theoretical Chemistry," vol. 8, pp. 284, 285. Longmans, Green and Co., N.Y.C. (1928).